United States Patent [19]

Shackman

[11] Patent Number: 4,783,158

[45] Date of Patent: Nov. 8, 1988

[54] HIGH IMAGE CONTRAST REFLECTING TELESCOPE

[76] Inventor: Stanley J. Shackman, 515 Soule, Ann Arbor, Mich. 48103

[21] Appl. No.: 95,668

[22] Filed: Sep. 14, 1987

[51] Int. Cl.⁴ .................... G02B 17/08; G02B 23/06; G02B 27/14

[52] U.S. Cl. .................... 350/503; 350/172; 350/505

[58] Field of Search .................... 350/503–505, 350/511, 537, 541, 558, 566–569, 557, 619–620, 172, 174, 442–444

[56] References Cited

U.S. PATENT DOCUMENTS 4,664,515 5/1987 Imura et al. .................... 350/444

FOREIGN PATENT DOCUMENTS 1242014 6/1967 Fed. Rep. of Germany ...... 350/174
877458 10/1981 U.S.S.R. .................... 350/505

*Primary Examiner*—William H. Punter

*Attorney, Agent, or Firm*—Reising, Ethington, Barnard, Perry & Milton

[57] ABSTRACT

A telescope assembly (10,10',10") including a primary mirror (12,12',12") and a secondary mirror (22,22',22") for receiving the primary light beam (50,50',50") reflected from the front side (14,14',14") of the primary mirror (12,12',12") and reflecting the primary light beam (50,50',50") to an eyepiece (28,28',28"). The secondary mirror (22,22',22") is disposed on the optical axis (18,18',18") defined by the primary mirror (12,12',12") and obstructs a portion of the primary light beam (50,50',50") received by the primary mirror (12,12',12"). An intercept mirror assembly intercepts the obstructed portion of the primary light beam (50,50',50") ahead of the rear side (26,26',26") of the secondary mirror (22,22',22") and merges the intercepted light beam into the primary light beam between the front faces (14,14',14",24,24',24") of the primary and secondary mirrors (12,12',12",22,22',22") to form an unobstructed view of the on-axis object.

11 Claims, 3 Drawing Sheets

HIGH IMAGE CONTRAST REFLECTING TELESCOPE

TECHNICAL FIELD

The present invention relates to improvements in reflecting telescopes. More specifically, the present invention relates to an auxiliary optical system for all types of reflecting telescopes, including the classical Newtonian, a modified Newtonian, and other reflectors which have an amplifying secondary mirror such as the classical Cassegrain, Gregorian, Maksutov, and Schmidt-Cassegrain.

BACKGROUND ART

The reflecting telescope is limited in contrast performance due to the spurious light levels induced by the central obstruction caused by the secondary mirror. This obstruction causes the impulse response or diffraction pattern to have higher side lobe levels than an unobstructed aperture. The additional light energy distributed in the region outside the main lobe response causes reduced contrast on extended objects such as planets and nebula. If the central obstruction were not present, the optical performance would be nearly perfect for an on-axis point like object (achromatic and ideal diffraction pattern) with contrast limited only by light scattered at the primary mirror surface and by deviations from an ideal parabolic surface. This is why a good refractor telescope is considered superior to the Newtonian or other reflecting telescope designs, by some, for planetary and other applications requiring low spurious noise levels.

Examples of prior art reflecting telescopes including auxiliary optical systems are U.S. Pat. Nos. 2,628,529 to Braymer, issued Feb. 17, 1953; 3,598,468 to Perry, issued Aug. 10, 1971; 3,667,827 to Lawrence, issued June 6, 1972; and 3,752,559 to Fletcher, et al, issued Aug. 14, 1973.

The Braymer patent discloses a reflecting telescope including an auxiliary optical system in which the primary image is formed by a right cone of rays whose base is the effective area of the primary mirror and whose axis is coincident with the principal axis of the instrument. The Perry patent discloses an optical system for a microscope including a spherical mirror tilted a few degrees relative to the optical axis and a plane plate having a transparent refractive portion in the path to the mirror and a reflective surface on the path from the mirror, with the plate tilted so that its refractive portion corrects astigmatism which results from tilting of the mirror. The Lawrence patent discloses a tele-objective in which the diffraction effects produced by the central obstruction effecting the image quality are very small. A relatively small positive achromatic doublet provides correction of aberrations of a concave spherical primary mirror. The Fletcher, et al, patent discloses a Ritchey-Chretien telescope responsive to images located off the telescope optical axis and includes a transparent plate positioned in the ray path of the image. The flat plate has a tilt angle relative to the ray path that compensates substantially for astigmatism introduced by the Ritchey-Chretien telescope.

None of the prior art patents provide a means for correcting for the central obstruction presented by the secondary mirror of a reflecting telescope.

SUMMARY OF THE INVENTION

In accordance with the present invention, there is provided a telescope including primary mirror means having a front and rear sides and defining an optical axis for reflecting a primary light beam received from an on-axis object and secondary mirror means having a front side and rear side for receiving the primary light beam reflected from the primary mirror means on the front side and reflecting the primary light beam to an eyepiece. The secondary mirror means is disposed on the optical axis and obstructs a portion of the primary light beam received by the primary mirror means. The invention is characterized by including intercept means for intercepting the obstructed portion of the primary light beam ahead of the secondary mirror means and merging the intercepted mirror light beam into the primary light beam between the primary and secondary mirrors to form an unobstructed view of the object.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
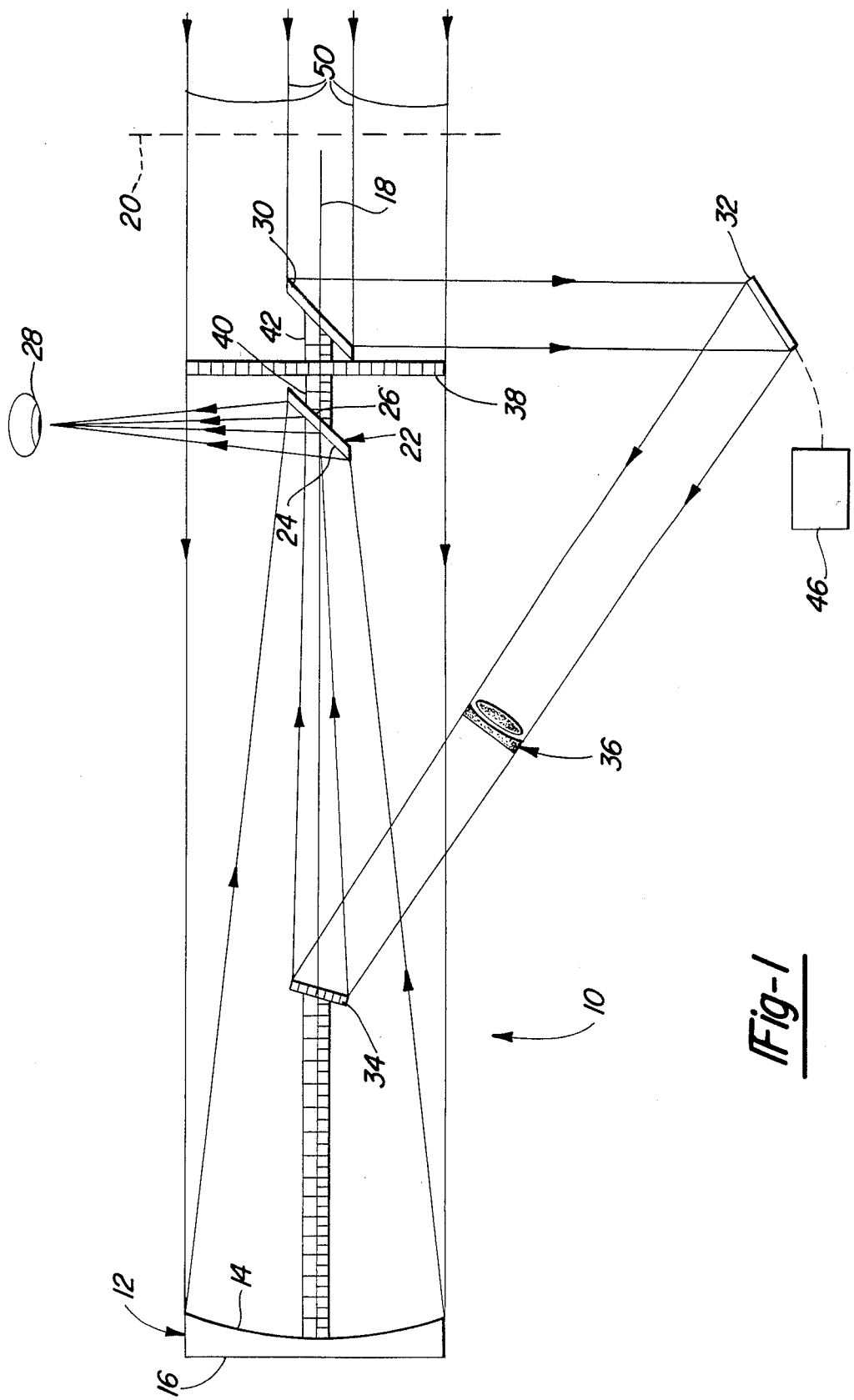
FIG. 1 is a diagrammatic, longitudinal, sectional view of a Newtonian telescope constructed in accordance with the present invention.

A telescope constructed in accordance with the present invention is generally shown at 10 in FIG. 1. Like structures between the different embodiments are shown as primed numbers.

The telescope shown in FIG. 1 is a classical Newtonian telescope. The telescope includes a primary mirror 12 having a front reflective side 14 and a rear side 16. The primary reflective mirror 12 defines an optical axis indicated at 18. The primary mirror 12 reflects a primary light beam indicated by arrows 50 received from an on-axis object. The light beams are parallel to the optical axis 18 and are perpendicular to a series of planes, one of which being schematically indicated at 20.

A secondary mirror is generally indicated at 22. The secondary mirror 22 is canted 45 degrees relative to the optical axis 18. The secondary mirror 22 has a front side 24 and a rear side 26. The secondary mirror 22 receives the primary light beam 50 reflected from the front side 14 of the primary mirror 12 and reflects the primary light beam 50 to an eyepiece 28. The secondary mirror 22 is disposed on the optical axis 18 and obstructs a portion of the primary light beam 50 received by the primary mirror 12.

The light blockage caused by the secondary mirror 22 is avoided by the present invention. The invention includes intercept means for intercepting the obstructed portion of the primary light beam 50 ahead of the rear side 26 of the secondary mirror 22 and merging the intercepted light beam into the primary light beam 50 between the front faces 14, 24 of the primary and secondary mirrors 12, 22 to form an unobstructed view of the on-axis object. The intercept means intercepts the otherwise blocked light beam before the light beam reaches the rear face 26 of the secondary mirror 22 and then merges the otherwise obstructed light beam back into the primary light beam 50 prior to the primary light beam 50 reaching the eyepiece 28.

More specifically, the intercept means includes a first intercept mirror 30 mounted adjacent the rear side 26 of the secondary mirror 22 for reflecting the obstructed portion of the primary light beam 50 off of the optical axis. A redirecting mirror 32 is mounted off of the optical axis 18 for redirecting the obstructed portion of the primary light beam reflected by the intercepting mirror 30 in the direction of the primary mirror 12. The assembly includes a merging mirror 34 for merging the obstructed portion of the primary light beam reflected from the redirecting mirror 32 into the primary light beam received by the eyepiece 28. A combination lens assemlby generally indicated at 36 converges the obstructed portion of the primary light beam into the primary light beam received by the eyepiece 28.

The primary mirror 12 has a predetermined focal length and the lens 36 has a focal length equal to the focal length of the primary mirror 12. In other words, the lens 36 has a focal length equal to the focal length of the primary mirror 12. The merging mirror 34 serves to merge the converging light from the lens 36 into the center of the primary light beam thus forming an effective fully illuminated aperture. The optical path length from the reference plane 20 to the focal points of the primary mirror 12 and the lens 36 must be equal. This implies that the distances in terms of the number of wave lengths of light is equal for the two optical paths at any particular frequency of visible light.

The primary mirror 12 is a parabolic mirror. The intercept mirror 30 is a flat mirror mounted on the optical axis 18 adjacent the rear side 26 of the secondary mirror 22. The reflecting mirror 32 is a flat mirror mounted off of the optical axis 18. A flat flass plate 38 is used as a support for the secondary mirror 22 and the intercepting mirror 30 through supports 40 and 42 diagrammatically shown, respectively.

The eyepiece lens 28 provides a primary focal adjustment. The assembly 10 includes secondary focal adjustment means for adjusting for path length compensations due to ambient environmental variations, such as changes in ambient temperature. The secondary focal adjustment means can include an adjustment mechanism shown schematically at 46 for translating the reflecting mirror 32 to bring the intercept means into correct phasing with the primary and secondary mirrors 12, 22.

Figure 2:
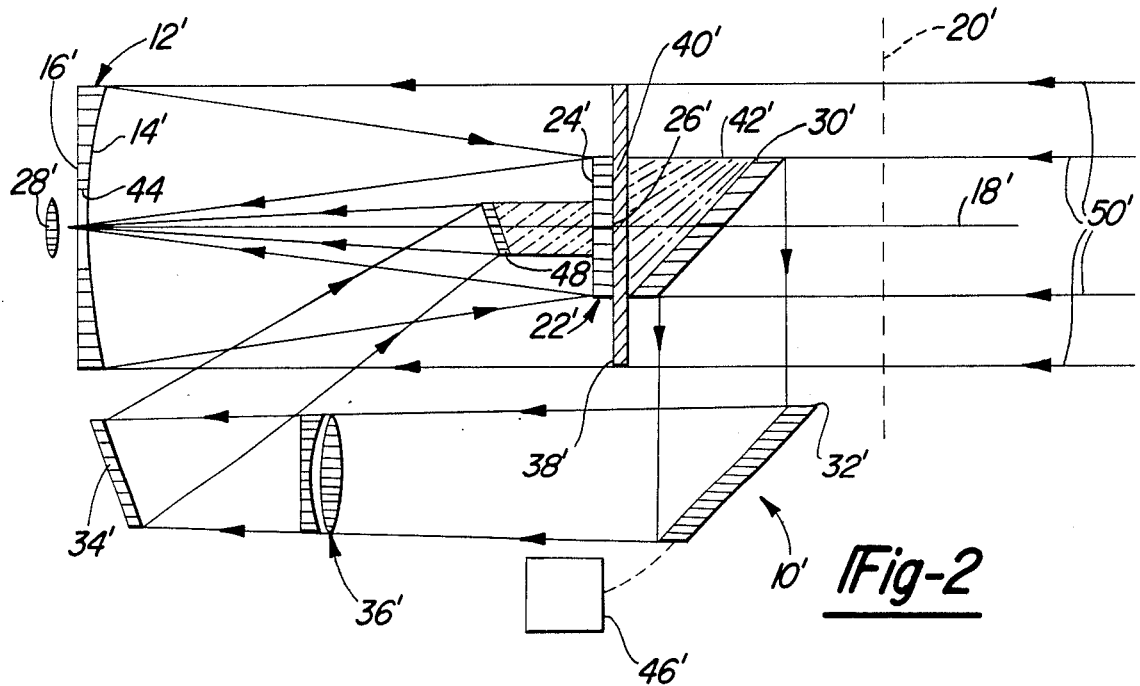
FIG. 2 is a diagrammatic, longitudinal, sectional view of a modified Newtonian telescope constructed in accordance with the present invention.

A modified Newtonian design telescope is generally shown at 10' in FIG. 2. For this design, the secondary mirror 22' is not at a 45 degree angle to the optical axis 18' as in the classical Newtonian mirror shown in FIG. 1, but is positioned at a 90 degree angle to the optical axis and reflects the light from the primary mirror 12' directly toward a perforation 44 in the primary mirror 12'.

Both the Newtonian telescope shown in FIG. 1 and the modified Newtonian telescope shown in FIG. 2 include secondary mirrors 22, 22' which aer non-amplifying mirrors. In these assemblies, the lens 36, 36' are disposed between the reflecting mirror 32, 32' and the merging mirrors 34, 34'. The secondary mirrors 22, 22' in both embodiments are flat mirrors. In the Newtonian telescope shown in FIG. 1, the merging mirror 34 is a flat mirror mounted on the optical axis 18 between the front side 14 of the primary mirror 12 and the front side 24 of the secondary mirror 22. The eyepiece 28 is mounted off of the optical axis 18. The lens assembly 36 includes a combination lens assembly mounted between the reflecting mirror 32 and the merging mirror 34, the lens 36 converging the light which is eventually merged by the merging mirror 34 to the primary light beam 50.

In the modified Newtonian design mirror as shown in FIG. 2, the secondary mirror 22' is not at a 45 degree angle to the optical axis 18' as in the classical Newtonian telescope shown in FIG. 1, but is positioned at a 90 degree angle to the optical axis 18' and reflects the light from the primary mirror 12' directly toward the perforation 44 in the primary mirror 12'. The eyepiece 28' is disposed behind the primary mirror 12'. This arrangement is not normally used because the obstruction must be at least ⅓ the diameter of the primary mirror 12' to permit access to the focal point for visual use. This limitation is overcome as the merging mirror means 34' includes a first flat merging mirror 32' off of the optical axis 18' receiving the reflected obstructed portion of the primary light beam from the intercepting mirror 30' and a second flat merging mirror 48 between the front faces 14', 24' of the primary and secondary mirrors 12', 22' and facing the primary mirror 12' for receiving the reflected light from the first flat merging mirror 34' and merging the light with the primary light beam reflected by the secondary mirror 22' to the eyepiece 28'. Unlike the Newtonian design telescope shown in FIG. 1 wherein the merging mirror 34 merges the obstructed light beam into the primary light beam on the secondary mirror 22, in the embodiment shown in FIG. 2, the second merging mirror 48 merges the obstructed light beam with the primary light beam reflected directly to the eyepiece 28'. Again, the lens assembly 36' includes a combination lens disposed between the reflecting mirror 32' and the first merging mirror 34'. The lens assembly 36' has the same focal length as the primary mirror 12' and is achromatic.

Figure 3:
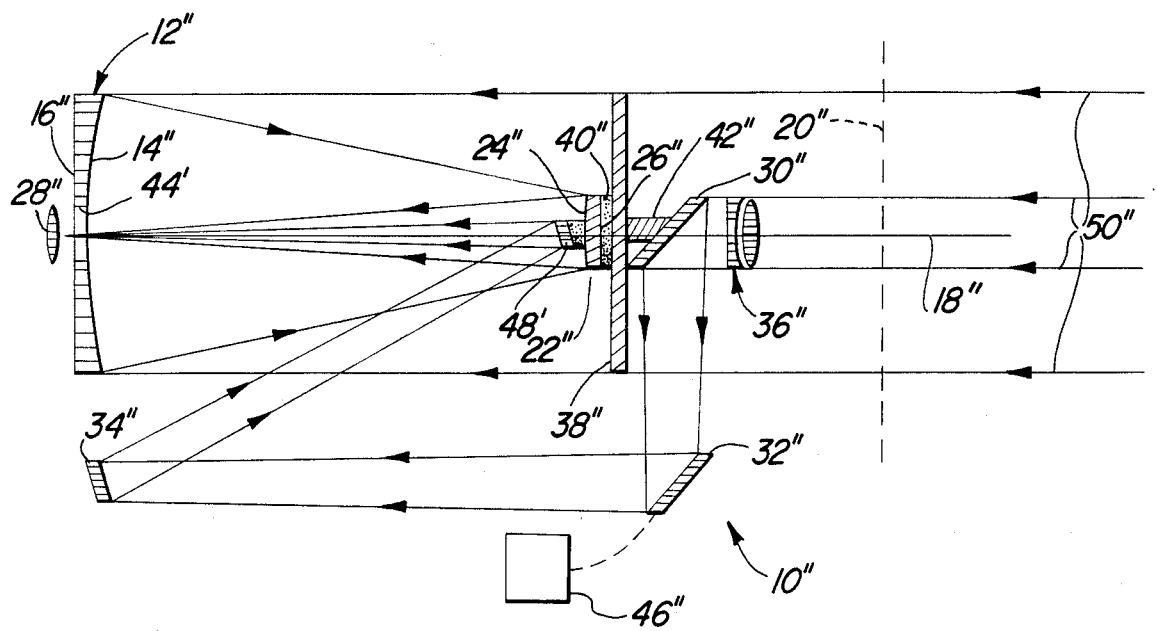
FIG. 3 is a diagrammatic, longitudinal, sectional view of a telescope including an amplifying secondary mirror constructed in accordance with the present invention.

The application of the present invention to the Cassegrain, Gregorian, Schmidt-Cassegrain and Maksutov are shown in FIG. 3. For the Maksutov and Schmidt-Cassegrain designs, the supporting window 38" assumes the optical shape required for the designs, and, for all the designs the secondary mirror 22' is not flat as shown in FIGS. 1 and 2 but is convex for all designs except for the Gregorian design, where it is concave ellipsoidal.

Referring to FIG. 3, the secondary mirror 22" is an amplifying mirror. The primary mirror 12" includes a central perforation 44' and an eyepiece 28" mounted therebehind. The merging mirror 34" is a first flat merging mirror 34" disposed off of the optical axis 18" for receiving reflected light from the reflecting mirror 32" and further includes a second flat merging mirror 48' mounted between the front faces 14" and 24" of the primary and secondary mirrors 12" and 22". The second flat merging mirror 48' faces the primary mirror 12″. The lens 36″ includes a combination lens disposed on the optical path 18″ in front of the intercepting mirror 30″. The position of the lens assembly 36″ has been moved to the entrance of the optical system just ahead of the obstruction point caused by the secondary mirror 22″. Since all of the primary mirror systems have shorter optical paths than their effective focal lengths as a result of the amplifying secondary mirrors 22″, the lens 36″ must have a longer focal length in order to match the focal length of the primary mirror system. The optical length of the intercepting mirror means is used entirely for converging the incoming light with none of the path used only for redirecting the incoming light. The telescope designs having amplifying secondary mirrors 22″ allow all of the mirrors of the intercept means to be smaller than the intercepted obstructed portion of the primary light beam.

In FIG. 3, a barlow lens can be used in conjunction with the lens 36″ to achieve the correct focal length and optical delay simultaneously, and to obtain more design flexibility. Since the image of a Gregorian telescope is erect, a prism must be added to this system to invert the image without causing reversion so that the two optical systems have the same image orientation.

As a comparative example, the modified Newtonian design telescope shown in FIG. 2 could be based on a 4 inch primary mirror 12′, with a 16 inch focal length for a focal ratio of f4. The lens assembly 36′ would also have a 16 inch focal length and would be 2 inches in diameter with the corresponding focal ratio of f8. For a typical Cassegrainian design as shown in general form in FIG. 3, the 4 inch primary mirror 12″ could have an 8 inch focal length with f2 local ratio and the overall system could have a f6 local ratio with a 24 inch focal length and 1 inch diameter secondary mirror 22″. The secondary optical system would have a 1 inch diameter lens with a 24 inch focal length for a focal ratio of f24. This is a smaller obstruction than shown in FIG. 2 and could be increased to provide a focal point which is further behind the primary mirror 12″. The high f number in this example eases the design of the achromatic objective. Given a particular application, an overall design trade-off would be conducted to optimize the combined system performance.

For all designs, the merging of the primary optical system with the intercept means is only perfect for an on-axis point, but the overall performance for a typical extended object would shown improvement over some finite angular interval.

Figure 4:
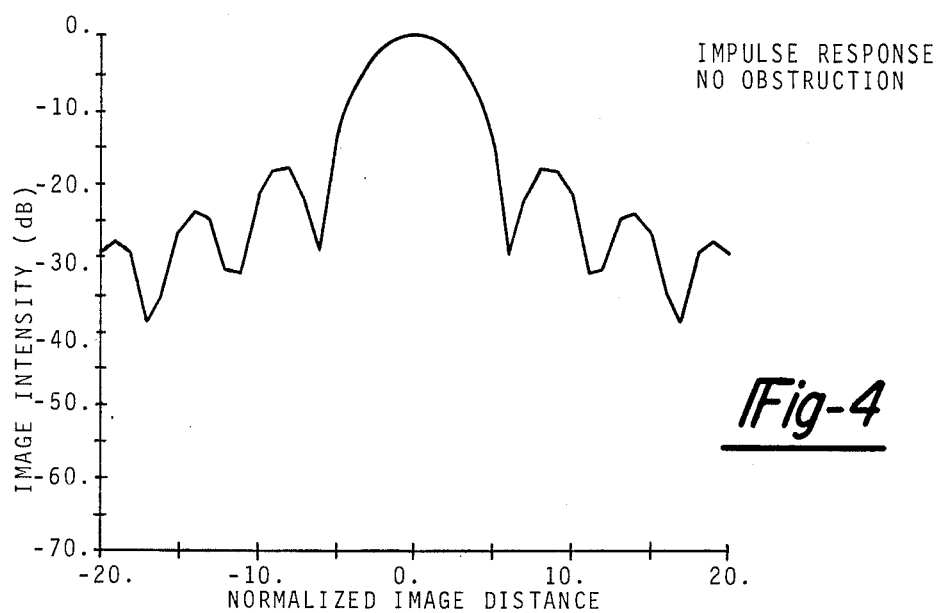
FIG. 4 is a computer generated plot of an impulse response for a circular aperture.
Figure 5:
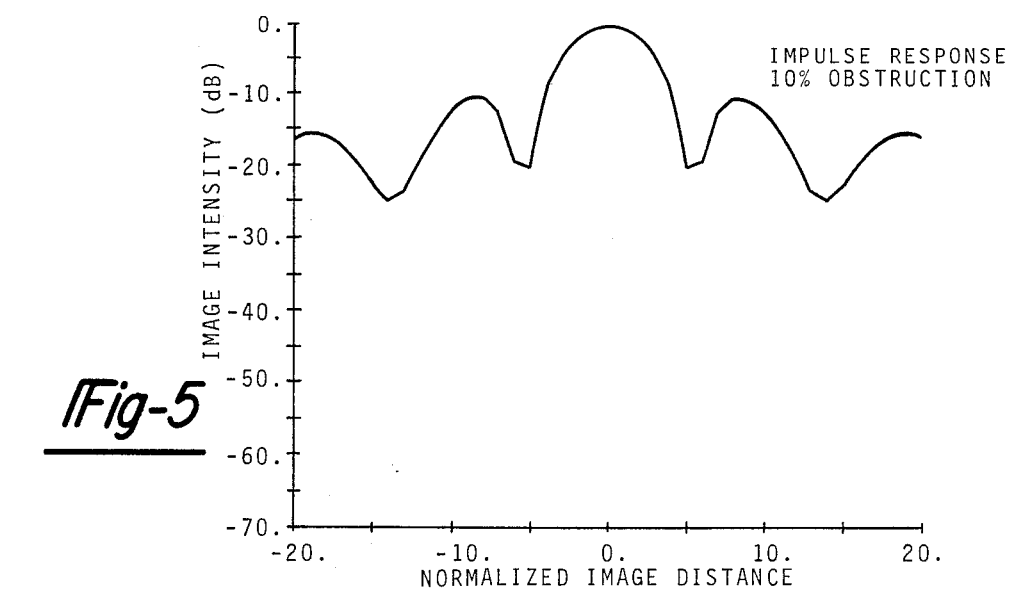
FIG. 5 is a computer generated plot of an impulse response for a circular aperture having a 10% circular obstruction.
Figure 6:
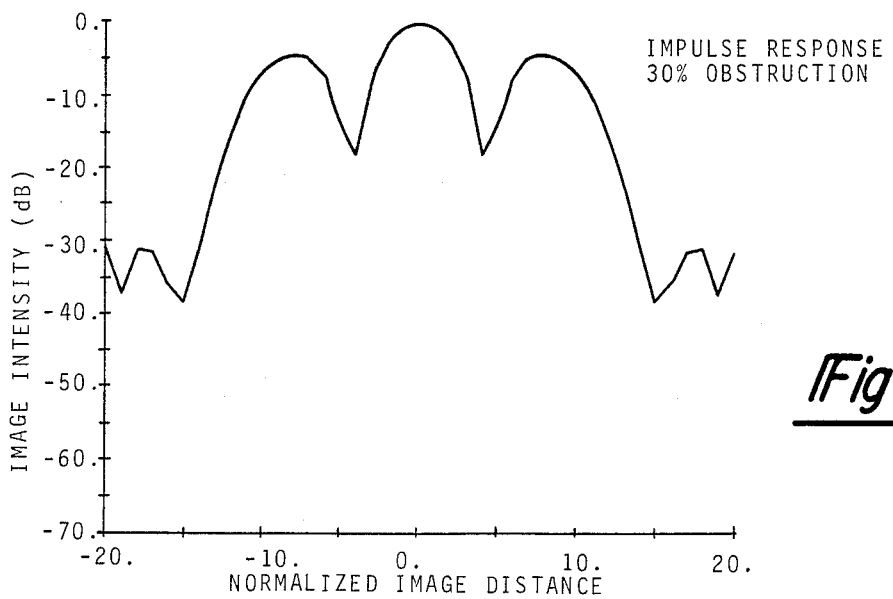
FIG. 6 is a computer generated plot of an impulse response for a circular aperture having a 30% obstruction.

FIGS. 4, 5, and 6 are computer generated plots of the impulse response for a circular aperture. The vertical axis is the log of the image intensity referenced to the peak of the response. The horizontal axis is given in normalized image distance units for the purpose of comparison of impulse width among the three figures. FIG. 4 shows the ideal response with first side lobes approximately 17 dB below the peak. FIG. 5 is for a 10% circular obstruction and FIG. 6 is for a 30% obstruction, where the percentage is the diameter of obstruction divided by the diameter of the primary mirror multiplied by one hundred (100). It can be seen that the energy in the side lobe region is increased as the obstruction is increased, thus lowering the contrast. The application of the correction obtained by the intercept means of the present invention permits the achievement of a response as shown in FIG. 4 given any size obstruction.

In implementing the present invention, the initial alignment of the primary mirror system with the intercept means path lens to a fraction of a wavelength are critical, and the relative mechanical stability required to maintain the fractional wavelength over temperature and mechanical stress variations is an additional consideration. A fine adjustment for path length compensation to account for temperature variations could be used in addition to the normal focus control as discussed above with regard to the secondary focal adjustment mechanism 46, 46′, 46″. In operation, first the image is focused, then the separate control 46, 46′, 46″ which translates the reflecting mirror 32″ in any of the embodiments brings the two systems into correct phasing. Other mirrors could also provide the same adjustment.

The optical window 38, 38′, 38″ could be replaced by the conventional spider support, but the system performance would be limited by spider diffraction. This can still offer a signficant improvement for some designs.

In most cases, the focal ratio of the lens assembly 36, 36′, 36″, will be greater than F10 (focal length/diameter being greater than 10). The high focal ratio of the lens assembly 36, 36′, 36″ is an advantage in constructing an achromatic lens which will not degrade the perfect color performance of the Newtonian reflector. As mirror technology improves to provide less scattered light due to surface imperfections and lens technology improves to provide better color correction, the technique described herein becomes more effective in achieving a high performance system.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A telescope (10,10′,10″) comprising: primary mirror means (12,12′,12″) having a front and rear side (14,14′,14″,16,16′,16″) and defining an optical axis (18,18′,18″) for reflecting a primary light beam (50,50′,50″) received from an on-axis object; secondary mirror means (22,22′,22″) having a front side (24,24′,24″) and rear side (26,26′,26″) for receiving the primary light beam (50,50′,50″) reflected from said front side (14,14′,14″) of said primary mirror means (12,12′,12″) and reflecting the primary light beam (50,50′,50″) to an eyepiece (28,28′,28″), said secondary mirror means (22,22′,22″) being disposed on said optical axis (18,18′,18″) and obstructing a portion of the primary light beam (50,50′,50″) received by said primary mirror means (12,12′,12″); and characterized by intercept means for intercepting the obstructed portion of the primary light beam (50,50′,50″) ahead of said rear side (26,26′,26″) of said secondary mirror means (22,22′,22″) and merging the intercepted light beam into the primary light beam (50,50′,50″) between said front faces (14,14′,14″,24,24′,24″) of said primary and secondary mirrors (12,12′,12″,22,22′,22″) to form an unobstructed view of the on-axis object.

2. A telescope as claimed in claim 1 further characterized by said intercept means including intercept mirror means (30,30′,30″) mounted adjacent said rear side (26,26′,26″) of said secondary mirror means (22,22′,22″) for reflecting the obstructed portion of the primary light beam off of said optical axis (18,18',18"), redirecting mirror means (32,32',32") mounted off of said optical axis for redirecting the obstructed portion of the primary light beam reflected by said intercept mirror means (30,30',30") in the direction of said primary mirror means (12,12',12"), merging mirror means (34,34',34") for merging the obstructed portion of the primary light beam reflected from said redirecting mirror means (32,32',32") into the primary light beam receives by the eyepiece (28,28',28"), and lens means (36,36',36") for converging the obstructed portion of the primary light beam into the primary light beam received by the eyepiece (28,28',28").

3. A telescope as claimed in claim 2 further characterized by said primary mirror means (12,12',12") having a predetermined focal length and said lens means (36,36',36') having a focal length equal to said focal length of said primary mirror means (12,12',12").

4. A telescope as claimed in claim 3 further characterized by said primary mirror means (12,12',12") being a parabolic mirror.

5. A telescope as claimed in claim 4 further characterized by said intercept mirror means (30,30',30") comprising a flat mirror mounted on said optical axis (18,18',18") adjacent said rear side (26,26',26") of said secondary mirror means (22,22',22"), said redirecting mirror means (32,32',32") being a flat mirror mounted off of said optical axis (18,18',18").

6. A telescope as claimed in claim 5 including an eyepiece lens (28) having a primary focal adjustment, said telescope (10,10',10") including a secondary focal adjustment means for adjusting for path length compensation due to ambient enviromental temperature variations.

7. A telescope as claimed in claim 6 further characterized by said secondary focal adjustment means including an adjustment mechanism (46,46',46") for translating said redirecting mirror means (32,32',32") to bring said intercept means into correct phasing with said primary and secondary mirror means (12,12',12",22,22',22").

8. A telescope as claimed in claim 7 further characterized by said secondary mirror means (22,22') comprising a non-amplifying mirror, said lens means (36,36') being dipsosed between said reflecting mirror means (32,32') and said converging mirror means (34,34').

9. A telescope as claimed in claim 8 further characterized by said secondary mirror means being a flat mirror, said merging mirror means (34) being a flat mirror mounted on said optical axis (18) between said front side (14) of said primary mirror means (12) and said front side (24) of said secondary mirror means (22), said telescope (10) including an eyepiece (28) mounted off of said optical axis (18), and said lens means (36) including a combination lens assembly mounted between said redirecting mirror means (32) and said merging mirror means (34).

10. A telescope as claimed in claim 9 further characterized by said secondary mirror means being a flat mirror (22') positioned at a 90 degree angle relative to said optical axis (18'), said primary mirror means (12') including a central perforation (44), said telescope (10') including an eyepiece lens (28') mounted to receive light through said perforation (44), said merging mirror means (34') including a first flat merging mirror (34') off of said optical axis (18') for receiving the reflected obstructed portion of the primary light beam from said intercepting mirror means (30') and a second flat merging mirror (48) between said front faces (14',24') of said primary and secondary mirrors (12',14') and facing said primary mirror (12',22') for receiving the reflected light from said first flat merging mirror (34') and merging the light with the primary light beam reflected by said secondary mirror (22') to said eyepiece (28'), said lens means including an combination lens disposed between said reflecting mirror (32') and said first merging mirror (34').

11. A telescope as claimed in claim 7 including an optical window support (38,38',38") supporting said secondary mirror means (22,22',22") and said intercepting mirror means (30,30',30") on said optical axes (18,18',18").

* * * * *